United States Patent Office 3,094,732
Patented June 25, 1963

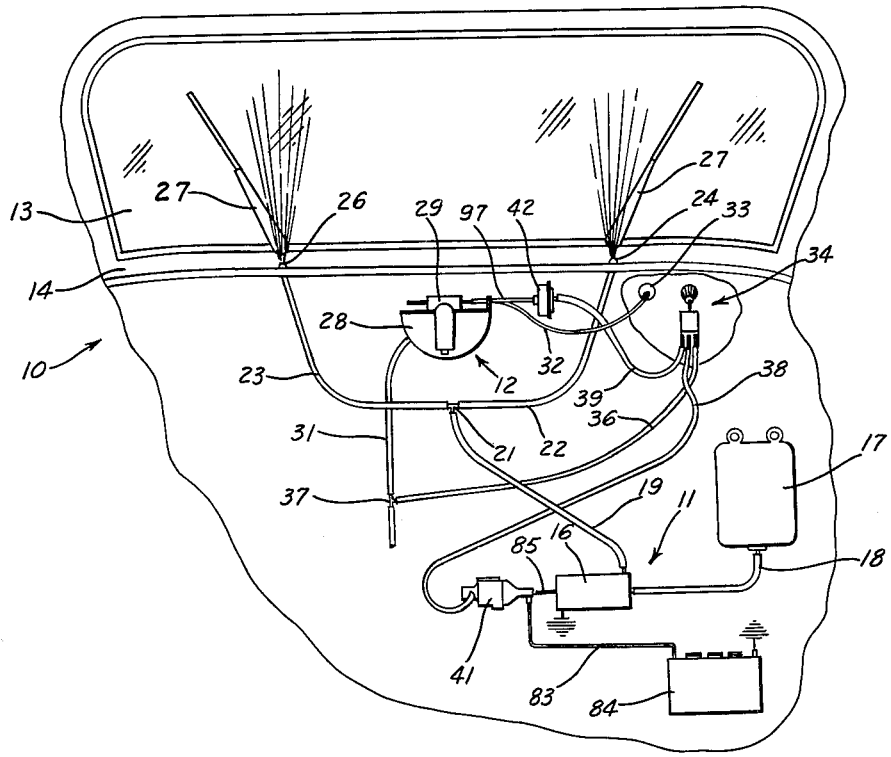
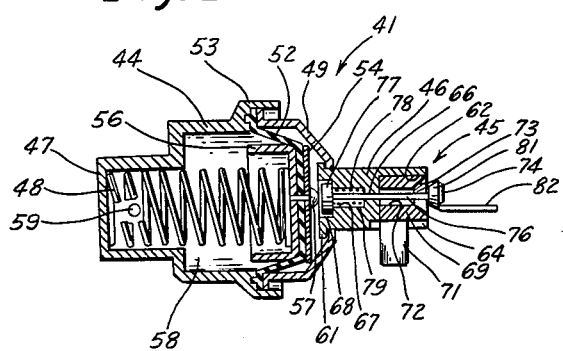
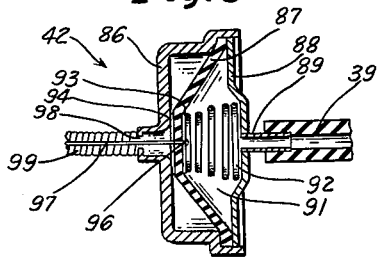

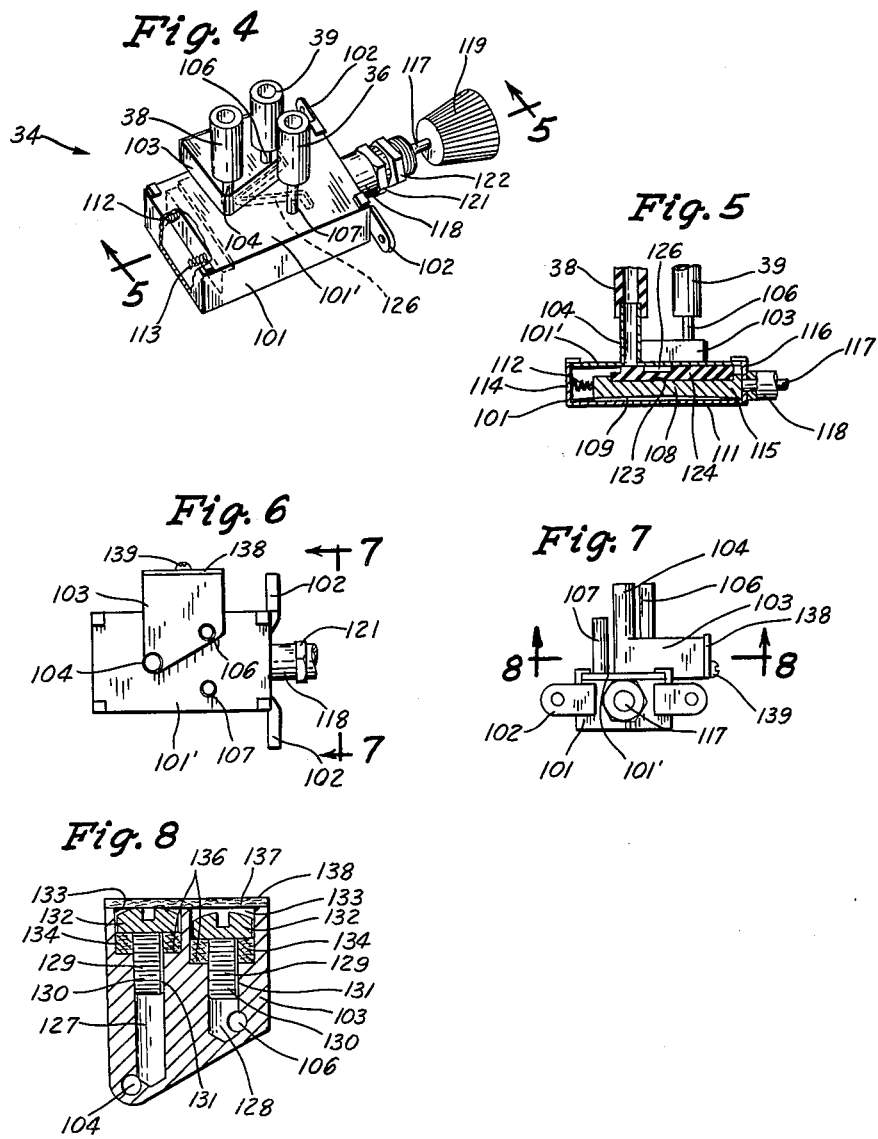

3,094,732
WINDSHIELD CLEANING SYSTEM
Robert R. Mandy, Detroit, and Donald Erkfritz, Clarkston, Mich., assignors to The Delman Company, Cookeville, Tenn., a corporation of Tennessee
Filed July 28, 1961, Ser. No. 127,583
4 Claims. (Cl. 15—250.02)

This invention relates generally to windshield cleaning systems and more particularly to a vacuum control for operating the clearing system.

An object of this invention is to provide in a windshield clearing system a novel time delay arrangement operable to concurrently actuate the wiper and washer units while de-actuating the wiper unit subsequently to de-actuation of the washer unit.

Another object of this invention is to provide in a windshield clearing system an improved time delay arrangement operable to concurrently actuate the wiper and washer units while variably selecting their respective cycles of operation, whereby one unit automatically de-actuates at a timed interval relative to the other unit.

Yet another object of this invention is to provide in a windshield clearing system a suction actuated control arrangement incorporating an operator-actuated valve having an independent atmospheric bleed built therein for each of the wiper and washer units, whereby the cycles of operation of the units are independently and individually varied.

A further object of this invention is the provision of a control valve incorporating independent time delay means capable of attaining the above mentioned objectives which is simple, economical, and effective.

These objects, and other features and advantages of this invention will become readily apparent upon reference to the following description when taken in conjunction with the accompanying drawings, wherein:

FIG. 1 is a fragmentary view of a vehicle showing a windshield clearing system incorporating the invention;

FIG. 2 is an enlarged longitudinal cross sectional view of an actuator for the fluid pump of the washer unit;

FIG. 3 is an enlarged longitudinal cross sectional view of an actuator for the wiper motor of the wiper unit;

FIG. 4 is an enlarged fragmentary perspective view of the operator-actuated control valve, certain parts broken away and others shown in dotted line for illustrative clarity;

FIG. 5 is a cross sectional view taken along the line 5—5 in FIG. 4;

FIG. 6 is a plan view of the valve of FIG. 4;

FIG. 7 is an end view of the valve viewed according to the line 7—7 in FIG. 6; and FIG. 8 is an enlarged cross sectional view taken along the line 8—8 in FIG. 7.

With reference to the drawings, there is illustrated in FIG. 1 a windshield clearing system as applied to an automobile 10 which includes a windshield washer unit 11 and a windshield wiper unit 12. The vehicle is illustrated as having a windshield 13 and an engine cowl 14 which extends forwardly of the windshield.

The washer unit 11 includes an electrically operated fluid pump 16 adapted upon operation to withdraw fluid from a reservoir 17 through a conduit 18. The fluid is pumped under pressure through another conduit 19 to a T-fitting 21, whereat the fluid is forced through a pair of fluid transmitting lines 22 and 23 to a pair of nozzles 24 and 26.

The nozzles 24 and 26 of the washer unit 11 are mounted on the automobile directly in front of the cowl 14 in a spaced manner so that each nozzle services one side of the windshield 13. The nozzles are of a known type embodying the jet principle, so as to emit and direct a high pressure stream of fluid against the windshield 13 and into the path of a respective wiper 27.

The wiper unit 12, in addition to the wipers 27, includes a conventional suction-operated wiper motor 28 which has a control valve 29 integral therewith adapted for on-off control of the motor 28. A hose 31 (FIG. 1) connects the wiper motor 28 in the usual manner with the intake manifold (not shown) of the vehicle engine which is utilized as a source of suction. A Bowden wire unit 32 includes a control knob 33 mounted on the vehicle dashboard (not shown) and is adapted to be operatively connected with the control valve 29 for control of the wiper motor 28 independent of the washer unit 11.

For the purpose of controlling and coordinating the operation of the washer and wiper units 11 and 12, respectively, a control unit is provided. The control unit includes an operator-actuated valve device 34 (FIGS. 1 and 4) mounted on the dashboard (not shown) and connected by a hose 36 to a T-fitting 37 interposed in the main suction hose 31. The control unit includes also a pair of hoses 38 and 39 which lead respectively from the valve device 34 to an actuating device 41 for the fluid pump 16, and to an actuating device 42 for the wiper motor control valve 29. As will be described in detail hereinafter, the control unit is arranged to operate the washer and wiper units concurrently, and also by virtue of selecting the length of the cycles of operation of both the wiper and washer units, to stop the operation of the wiper unit 12 at an interval of time subsequent to the stopping or deactuation of the washer unit 11.

Referring to FIG. 2, the actuating device 41 for the fluid pump 16 includes a substantially cylindrical casing 44 and tubular body 46 forming part of an electric switch 45. One end 47 of the casing 44 is formed with a cylindrical pocket for seating a coil spring 48 therein, and the other end of the casing 44 is enclosed by a cover 49. The cover is secured to the body 46 and also functions to clamp the periphery of a flexible diaphragm 52 into a grooved flange 53 of the casing 44. A flat disc 54 is mounted on one side of the diaphragm 52, and a cup-shaped piston 56 is mounted on the other side thereof and against which the coil spring 48 is biased. The disc 54, piston 56 and the central portion of the diaphragm 52 are held in assembled relation by a screw 57 of nonconductive material. As seen hereinafter, movement of the diaphragm 52 longitudinally of the casing 44 effects an on-off operation of the electric switch 45. Subatmospheric pressure is admitted into the chamber 58, formed in the casing 44 and on the left side of the diaphragm 52 as viewed in FIG. 2, by connecting the hose 38 from the valve device 34 with an opening 59 formed in a wall of the casing 44.

The tubular body 46 of the electric switch 45 is also of a nonconductive material and is provided at its inner end with a flange 61 for insertion into an opening provided therefor in the casing 44. A large bore 62 is formed in the body 46 at the outer end opposite the flange 61, and includes a slot 64 extended longitudinally of the bore 62. Inwardly of the bore 62 is a smaller and shorter bore 66 which leads to a slightly larger bore 67 ending in a circular cavity 68 at the flange end 61 of the switch body 46.

A tubular electrical contact 69 (FIG. 2) having a radially extended terminal 71 is forcibly fitted into the bore 62, with the terminal 71 extended through the slot 64. The terminal 71 is electrically connected by a line 83 to the vehicle battery 84. The contact 69 has a bore 72 formed therein which is axially aligned with the switch body bore 66, and the outer end of which is formed with a conically shaped cavity 73. For coaction with the stationary contact 69, there is provided a movable electrical contact 74 which includes a stem 76 coaxially inserted for reciprocal movement through the bore 72 of the stationary contact 69, and through the bores 66 and 67 of the switch body 46.

A collar or stop member 77 (FIG. 2) is secured on the inner end of the stem 76, which, upon engagement by the spring biased screw 57 is forced into the cavity 68. A small coil spring 78 is inserted between the stop member 77 and a shoulder 79, formed at the junction of the bores 66 and 67, for normally biasing the stop member 77 and thus the entire movable contact 74 toward the screw 57, or to the left as illustrated in FIG. 2. At the outer end of the stem 76 is secured an electrically conductive plug 81 having a tapered or frusto-conical shape, and which is adapted to firmly seat in a nested relation within the conical cavity 73. A terminal 82 is secured to the plug 81 and is electrically connected by a line 85 to the fluid pump 16. Since the bore 72 of the stationary contact 69 is larger and in axial alignment with the small bore 66 of the switch body 46, the stem 76 of the movable contact 74 is in a substantial clearance relation with the bore 72. Thus, should the stem 76 be of a conductive material, engagement with the normally hot contact 69 is eliminated.

Referring now to FIG. 3, the actuating device 42 for the wiper motor control valve 29 is illustrated. The device 42 comprises a circular housing 86 within which a diaphragm 87 is held by means of a cover 88 secured to the housing 86 at its open end. A nozzle 89 is formed centrally in the cover 88 for communicating with the line 39 from the operator-actuated valve device 34. Within a chamber 91 formed between the diaphragm 87 and the cover 88, a spring 92 is mounted for biasing the diaphragm 87 to the left, as illustrated in FIG. 3. One end of the spring 92 abuts against a plate 93 for securing, in cooperation with another plate 94, one end 96 of a Bowden wire 97 which extends through an opening 98 formed in the housing 86. The Bowden wire 97 and its sheath 99 are connected in a known manner to the wiper motor control valve 29. By movement of the diaphragm 87 back and forth within the housing 86, as will be described hereinafter in a more detailed manner, the wiper motor control valve 29 is moved to either an on or an off position for controlling operation of the motor 28.

The valve device 34 (FIG. 1) is provided for coordinating and selectively controlling the operation of the actuating devices 41 and 42, and thus controlling the cycles of operation of the washer and wiper units 11 and 12, respectively. This device 34, best shown in FIGS. 4-8 inclusive, is of a slide type and comprises a housing 101 having a cover 101' and ears 102 formed thereon for mounting purposes. A bleed plug body 103 is mounted on the cover 101 and includes a pair of hose connections 104 and 106. The housing cover 101' also includes integral therewith a hose connection 107 which forms with the other hose connections 104 and 106 a triangular arrangement as illustrated in FIGS. 4 and 6.

Within the housing 101, a slide valve 108 is biased upwardly toward the cover 101' by means of a leaf spring 109 (FIG. 5) inserted between the slide valve 108 and the bottom 111 of the housing 101. A pair of coil springs 112 and 113 (FIG. 4) are inserted in spaced relation between the rear end 114 of the housing 101 and the rear of the slide valve 108, for biasing the valve 108 toward the forward end 116 of the housing 101. The forward end 115 of the slide valve abuts against a shaft 117 which extends through a short tubular projection 118 of the housing 101 for connection at its outer end with a knob 119. The knob 119 extends into the interior of the operator's compartment of the vehicle 10 for manipulation by the operator. A pair of locking nuts 121 and 122 (FIG. 4) are provided for mounting of the valve device 34.

Seated in a cavity 123 formed on top of the slide valve 108 is a resilient member 124 which has a V-shaped depression 126 (FIG. 4) formed therein. By this arrangement, when the slide valve 108 is in its normally biased position as illustrated in FIG. 5, the depression 126 is placed forward of and does not register with the three hose connections 104, 106, and 107, whereby fluid under subatmospheric pressure from hose 36 is not applied to the hose connections 104 and 106. However, upon pushing forward the control knob 119 (FIG. 4), wherein the slide valve 108 is pushed rearwardly of the housing 101 and against the compression of the springs 112 and 113, the depression 126 is placed in registration with all three hose connections so as to communicate the connections 104 and 106 with the main supply hose connection 107.

For the purpose of permitting air under atmospheric pressure to bleed into each hose 38 and 39, a pair of separate threaded passages 127 and 128 (FIG. 8) are formed in the bleed plug body 103, and which are respectively in communication with the bores of the hose connections 104 and 106. Each passage has a threaded plug 129 threadably inserted therein and which has formed along its shank 130 a groove 131 for permitting air passing between the head 132 of the screw and a cavity 133 formed therefor to pass into the passage and its respective hose connection. A plurality of circular plug members 134 of a fibrous, porous material are inserted about the shank 130 of each plug, and are compressed between the head 132 and the base 136 of the cavity 133 by a threading down of the plug 129.

Thus, by changing the compression of the fibrous members 134 by axial movement of a plug 129, the restriction of the fibrous members to the passage of air therethrough is changed. Therefore, the rate of the passage of atmospheric air through either passage 127 or 128 is variable with respect to the rate of bleed of the other passage. A fibrous washer 137 is retained on top of both cavities 136 by means of a cover 138 secured to the body 103 by a screw 139 (FIG. 7) and acts as an air filter for the air passing into the passages 127 and 128.

To place the windshield wiper system in operation, the control knob 119 (FIG. 4) is pressed inwardly of the valve device 34. This movement permits air under subatmospheric pressure from the main suction hose 36 to be applied to the hoses 38 and 39, connected respectively to the actuating devices 41 and 42. At the device 41 (FIGS. 1 and 2), the withdrawal of air from the chamber 58 permits the diaphragm 52 to be forced against the spring 48 whereby the switch collar 77 is freed to move with the screw 57 and into the cover 49 under pressure of the switch spring 78. The conductive plug 81 is thereby moved into the cavity 73 of the stationary contact 69 to effect a closed circuit, and the fluid pump 16 is energized to effect a discharge of fluid from the reservoir 17 through the nozzles 26.

Simultaneously, at the device 42 (FIGS. 1 and 3) the withdrawal of atmospheric air from the chamber 91 results in the diaphragm 87 moving against the compression of the spring 92. The Bowden wire end 96 is therefore pulled into the housing 86, which movement of the Bowden wire 97 effects the control valve 29 to begin operation of the wiper motor 28. Oscillation of the wipers 27 is therefore begun substantially simultaneously with discharge of fluid against the windshield 13. This operation continues as long as the control knob 119 is held in, or pressed against the dashboard.

Upon a release of the control knob 119, the slide valve 108 is spring returned to its normal position of FIG. 5, and the communication between the main hose connection 107 and the receiving hose connections 104 and 106 is blocked. Depending upon the pre-set nature of each bleed plug 129, air under atmospheric pressure is bled at a certain rate into the respective hose connections 104 and 106, and through their respective hoses 38 and 39. Thus, at each actuating device 41 and 42, upon the timed attainment of atmospheric air on both sides of the respective diaphragms, the springs 48 (FIG. 2) and 92 (FIG. 3) force the diaphragms back to their original non-operative positions.

In the device 41 (FIG. 2), the switch collar 77 is engaged by the screw 57 and is forced back into its cavity 68 against the bias of the small spring 78. Through the stem 76, the plug 81 is moved out of engagement with the stationary contact 69, thus breaking the electric connection between the terminals 71 and 82. The fluid pump 16 is thereby re-actuated. In the device 42 (FIG. 3), as atmospheric air is bled back into the chamber 91, the spring 92 forces the diaphragm 87 back to its non-operative position, resulting in the Bowden wire 97 being moved to the left as viewed in FIG. 3. This effects a de-actuation of the wiper motor 28 through operation of the control valve 29.

In summation, the arrangement is such that independent control over the duration of operation of each of the wiper and washer units is provided by incorporating into the windshield clearing system a valve device having pre-settable selective bleed means for the actuating devices of both units.

Although a preferred embodiment of the invention has been disclosed herein, various modifications and alternate construction can be made thereto within the scope of the invention as defined in the appended claims.

We claim:

1. In a vehicle windshield clearing system including a wiper unit having a wiper motor and a fluid pressure operable control therefor, a washer unit having a fluid pump and a fluid pressure operable control therefor, and a source of subatmospheric pressure, a suction actuated control system for operating said wiper and washer units in variably timed relationship comprising, operator-actuated valve means including a housing having a chamber fluid connectable to said subatmospheric pressure source, said valve means operable to open and close said chamber to said source, a pair of fluid transmission lines each connected at one end to said chamber when open, one of said lines connected at the other end to said wiper motor control, and the other of said lines connected at its other end to said fluid pump control, and a pair of fluid bleed means each mounted in said housing and each connected to one of said lines, said bleed means providing a continuous bleed of atmospheric air into said lines during operation of said valve means to open said chamber, each bleed means adjustable whereby the relative bleeding of atmospheric air into said lines during operation of said valve means to open said chamber is selectively variable to provide thereby selected operating cycles of said washer and wiper units.

2. A vehicle windshield cleaning system for vehicles comprising a wiper motor and a control valve therefor, a first fluid pressure actuating means operatively connected to said control valve, a washer unit including a nozzle, a pump means, a second fluid pressure actuating means operatively connected to said pump means, a reservoir of washing liquid, and interconnecting lines therefor, a source of fluid under a subatmospheric pressure having a supply line, a manually actuated valve connected in said supply line, said manually actuated valve, when opened, directly connecting the source of subatmospheric pressure to said first actuating means to actuate said control valve and to said second actuating means to actuate said pump means to supply liquid to the nozzle, and bleed means connected to said valve, said bleed means continuously bleeding atmospheric pressure to both said first and second actuating means, when said valve is opened, at variable relative rates of bleeding therebetween providing thereby selected operating cycles of said washer and wiper units.

3. A vehicle windshield cleaning system for vehicles comprising a wiper motor and a control valve therefor, a first fluid pressure actuating means operatively connected to said control valve, a washer unit including a nozzle, a pump means, a second fluid pressure actuating means operatively connected to said pump means, a reservoir of washing liquid, and interconnecting lines therefor, a source of fluid under a subatmospheric pressure having a supply line, a manually actuated valve connected in said supply line, a pair of fluid transmission conduits leading from said valve to said first and second actuating means, said valve, when opened, directly connecting said pressure source through one conduit to said first actuating means to actuate said control valve and through the other conduit to said second actuating means to actuate said pump means to supply liquid to the nozzle, and bleed means connected to said valve and continuously operable when said valve is opened, said bleed means including a pair of independent bleed devices each communicating the atmosphere with a respective conduit, each bleed device adapted to vary the rate of the passage of atmospheric air into its respective conduit, providing thereby selected operating cycles of said washer and wiper units.

4. A vehicle windshield cleaning system for vehicles comprising a wiper motor and a control valve therefor, a first fluid pressure actuating means operatively connected to said control valve, a washer unit including a nozzle, a pump means, a second fluid pressure actuating means operatively connected to said pump means, a reservoir of washing liquid, and interconnecting lines therefor, a source of fluid under a subatmospheric pressure having a supply line, a manually actuated valve connected in said supply line, said valve including a housing having a trio of separate openings formed therein, one of said openings fluid connected to said supply line, the remaining two openings each fluid connected one to said first actuating means to actuate said control valve and the other to said second actuating means to actuate said pump means to supply liquid to the nozzle, said housing having a movable chamber formed therein which is operable to connect said three openings together, and bleed means mounted on said housing, said bleed means including a pair of independent bleed devices each communicating one of said remaining two openings to the atmosphere, each bleed device adapted to vary the rate of the passage of atmospheric air into its respective opening, providing thereby selected operating cycles of said wiper and washer units.

References Cited in the file of this patent

UNITED STATES PATENTS 3,000,033     Webb                 Sept. 19, 1961